(12) United States Patent
Naugler

(10) Patent No.: US 12,062,894 B2
(45) Date of Patent: Aug. 13, 2024

(54) CABLE CLIPS FOR WIRE MANAGEMENT

(71) Applicant: Hubbell Incorporated, Shelton, CT (US)

(72) Inventor: Kurt Naugler, Bedford, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 17/421,138

(22) PCT Filed: Jan. 8, 2020

(86) PCT No.: PCT/US2020/012785
§ 371 (c)(1),
(2) Date: Jul. 7, 2021

(87) PCT Pub. No.: WO2020/146531
PCT Pub. Date: Jul. 16, 2020

(65) Prior Publication Data
US 2022/0060006 A1 Feb. 24, 2022

Related U.S. Application Data

(60) Provisional application No. 62/790,280, filed on Jan. 9, 2019.

(51) Int. Cl.
*H02G 3/04* (2006.01)
*F16L 3/137* (2006.01)
(Continued)

(52) U.S. Cl.
CPC ............ *H02G 3/0456* (2013.01); *F16L 3/137* (2013.01); *F16L 3/233* (2013.01); *H02S 30/10* (2014.12); *H02S 40/30* (2014.12)

(58) Field of Classification Search
CPC ... F16L 3/137; F16L 3/233; F16L 3/24; F16L 3/243; F16L 3/2431; F16L 3/245; F16L 3/06; F16L 3/14; H02G 3/0456
See application file for complete search history.

(56) References Cited

U.S. PATENT DOCUMENTS 499,549 A * 6/1893 Cajar .................. F16L 3/24
248/72
2,065,843 A   12/1936 Van Uum
(Continued)

FOREIGN PATENT DOCUMENTS

DE           257988       6/1912
DE           29913965 U1 * 11/1999 ............. A47B 21/06
(Continued)

OTHER PUBLICATIONS

Machine translation of DE 29913965.*
(Continued)

*Primary Examiner* — Christopher Garft
(74) *Attorney, Agent, or Firm* — Wissing Miller LLP

(57) ABSTRACT

Cable clips for supporting one or more cables or wires that can be quickly and releasably affixed to metal structures for wire management purposes are provided. The cable clips include a cable holding portion and a plurality of attachment members used to quickly and releasably affixed to the cable clip to metal structures. The cable holding portion and plurality of attachment members are made of an environmentally durable material.

20 Claims, 15 Drawing Sheets

(51) Int. Cl.
*F16L 3/233* (2006.01)
*H02S 30/10* (2014.01)
*H02S 40/30* (2014.01)

(56) References Cited

U.S. PATENT DOCUMENTS

| | | | |
|---|---|---|---|
| 3,147,523 A | 9/1964 | Logan | |
| RE26,247 E * | 8/1967 | Tinnerman | F16L 3/24 |
| | | | 248/71 |
| 3,590,442 A | 7/1971 | Geisinger | |
| 3,737,128 A | 6/1973 | Schuplin | |
| 3,952,373 A | 4/1976 | Noorily | |
| 4,073,458 A | 2/1978 | Sease | |
| 4,074,885 A * | 2/1978 | Hacker, Jr. | E04B 9/006 |
| | | | 24/326 |
| 4,318,525 A * | 3/1982 | Welch | F16M 13/027 |
| | | | 248/228.7 |
| 6,161,804 A | 12/2000 | Paske | |
| 6,276,644 B1 | 8/2001 | Jennings | |
| 6,296,430 B1 | 10/2001 | Fischer | |
| 6,565,048 B1 | 5/2003 | Meyer | |
| 6,698,069 B2 | 3/2004 | Caveney | |
| 7,717,387 B2 | 5/2010 | Naheem | |
| 7,793,895 B2 | 9/2010 | Franks | |
| 8,020,811 B2 | 9/2011 | Nelson | |
| 8,028,962 B2 | 10/2011 | Geiger | |
| 8,092,129 B2 * | 1/2012 | Wiley | F16B 43/00 |
| | | | 411/160 |
| 8,282,047 B2 | 10/2012 | Franks | |
| 10,253,905 B2 * | 4/2019 | Martin | H02G 3/32 |
| 10,454,190 B1 * | 10/2019 | Martin | H02S 30/00 |
| 2002/0066833 A1 | 6/2002 | Ferrill | |
| 2003/0234116 A1 | 12/2003 | Uchida | |
| 2005/0069398 A1 | 3/2005 | Arbuckle | |
| 2007/0272807 A1 | 11/2007 | Takagaki | |
| 2008/0093510 A1 | 4/2008 | Oh | |
| 2011/0073718 A1 * | 3/2011 | Whipple | H02G 3/30 |
| | | | 248/58 |
| 2014/0017025 A1 | 1/2014 | Hemingway | |
| 2015/0225978 A1 * | 8/2015 | White | E04H 17/045 |
| | | | 248/219.3 |
| 2015/0276093 A1 * | 10/2015 | Aotani | H02G 3/32 |
| | | | 248/72 |
| 2016/0025244 A1 * | 1/2016 | Tally | H02G 3/32 |
| | | | 29/428 |
| 2016/0223100 A1 | 8/2016 | Geiger | |
| 2018/0371788 A1 | 12/2018 | Durham | |

FOREIGN PATENT DOCUMENTS

| | | |
|---|---|---|
| GB | 1207741 | 10/1970 |
| WO | 2017149271 | 9/2017 |

OTHER PUBLICATIONS

Burndy LLC Product Sheet fr Wire Management Solutions 2015, (6 pages).
Panduit (TM) Product Bulletin for Fir Tree Push Mounts and Assemblies, May 2017 (2 pages).
ABB Ty Met(TM), Stainless Steel Cable Ties Brochure, 2018, (4 pages.).
Hellermann 13-1053-006-CSU Jan. 19, 2015.
International Search Report and Written Report mailed in corresponding PCT/2020/012785 on Apr. 21, 2021 (10 pages).
International Preliminary Report on Patentability mailed in corresponding PCT/2020/012785 on Jun. 16, 2021 (7 pages).

* cited by examiner

CABLE CLIPS FOR WIRE MANAGEMENT

CROSS-REFERENCE TO RELATED APPLICATIONS

This application is a 371 of PCT/US2020/012785 filed on Jan. 8, 2020, published on Jul. 16, 2020 under publication number WO 2020/146531 A1, which claims priority benefits from U.S. Provisional Patent Application No. 62/790,280, filed Jan. 9, 2019, both of which are incorporated herein in their entirety by reference.

BACKGROUND

Field

The present disclosure relates generally to cable clips for wire management and other purposes, and more particularly to electrical cable clips having a strap and mounting hooks used to affix the cable clips to a structure.

Description of the Related Art

In recent years, the use of photovoltaic arrays to provide electrical power in commercial, residential, and other environments has become popular. Photovoltaic arrays are typically composed of a number of photovoltaic modules set within a metallic frame, and a rail system that supports the photovoltaic modules. When installing a photovoltaic array, a number of photovoltaic modules are assembled onto the rail system. The metallic frames of the individual photovoltaic modules, and the structural pieces, e.g., the rails, on which the modules mount are generally made out of aluminum.

Electrical power generated by such photovoltaic arrays is transferred to a distribution system using electrical cabling. The National Electric Code requires electrical cables be supported at specified lengths in many applications. Such electrical cabling is often routed along the rails and secured in place using plastic cable ties that often degrade in the weather over time, or using other cable clamps that are attached to the rail system with a fastener traditionally secured to mounting holes or slots in the rail system. Such fasteners include push-pin fasteners (which are also known as fir tree fasteners or tree type fasteners) and other mechanical fasteners, such as clamps, P-clips, and flange clips. Like plastic cable ties, push-pin style fasteners are typically made of plastic and often degrade in typical environmental conditions over time. Other mechanical fasteners typically require tools to install increasing installation costs.

This present disclosure provides a cable clip that combines an environmentally durable metallic or non-metallic, e.g., non-degradable, strap portion for supporting electrical cabling with an environmentally durable metallic or non-metallic, e.g., non-degradable, connection geometry that allows for installation through multiple mounting hole or slot geometries in conventional rail systems without the need for tools and thus reducing the installation costs.

SUMMARY

The present disclosure provides descriptions of embodiments of cable clips for supporting one or more cables or wires and that can be quickly and releasably affixed to metal structures for wire management purposes. The cable clips include a cable holding portion and a plurality of attachment members with geometries used to quickly and releasably affix the cable clip to metal structures. The geometry of the attachment members is configured to provide a reusable connection between the cable holding portion and the structure. The cable holding portion and plurality of attachment members are made of an environmentally durable material, such as stainless steel or other corrosion resistant material.

In one exemplary embodiment, the cable clip includes a cable holding portion and a plurality of attachment members. A first attachment member is monolithically formed into or joined to a first end of the cable holding portion and a second attachment member is monolithically formed into or joined to a second end of the cable holding portion. In an exemplary embodiment, the cable holding portion includes a bulbus portion for supporting cables or wires and a neck to which the first and second attachment members are monolithically formed into or joined to. The cable holding portion may be a flexible flat strip having a rectangular or square cross-section, or the cable holding portion may be a flexible, solid or stranded rope-like material with a circular cross-section.

In another exemplary embodiment, the cable clip includes a cable holding portion, a first attachment member and a second attachment member. In an exemplary embodiment, the cable holding portion includes a bulbus portion for supporting cables or wires and a neck that includes a first end and a second end of the cable holding portion. The cable holding portion may be a flexible flat strip having a rectangular or square cross-section, or the cable holding portion may be a flexible, solid or stranded rope-like material with a circular cross-section. The first attachment member includes a lower wall, an upper wall, first and second side walls and a lip. The lower wall has a first end monolithically formed into or joined to the first end of the cable holding portion and a second end monolithically formed into or joined to a first end of the first side wall. The upper wall has a first end monolithically formed into or joined to a second end of the first side wall and a second end monolithically formed into or joined to a first end of a second side wall. The lip has a first end monolithically formed into or joined to a second end of the second side wall and a second end extending in the direction of the first side wall such that there is a gap between the lower wall and the lip. The lower wall, the upper wall, the first and second side walls and the lip form a pocket.

The second attachment member includes a lower wall, an upper wall, first and second side walls and a lip. The lower wall has a first end monolithically formed into or joined to the second end of the cable holding portion and a second end monolithically formed into or joined to a first end of the first side wall. The upper wall has a first end monolithically formed into or joined to a second end of the first side wall and a second end monolithically formed into or joined to a first end of a second side wall. The lip has a first end monolithically formed into or joined to a second end of the second side wall and a second end extending in the direction of the first side wall such that there is a gap between the lower wall and the lip. The lower wall, the upper wall, the first and second side walls and the lip form a pocket.

BRIEF DESCRIPTION OF THE DRAWINGS

The figures depict configurations of the cable clip for purposes of illustration only. One skilled in the art will readily recognize from the following description that alternative configurations of the structures illustrated herein may be employed without departing from the principles described herein, wherein.

DETAILED DESCRIPTION

The present disclosure provides descriptions of configurations for cable clips used for wire management purposes. More specifically, the cable clips can be quickly and releasably attached to a structure and used to support items and/or tie the items into a bundle. For ease of description, the cable clips may also be referred to as the "clip" in the singular and the "clips" in the plural. For ease of description, the items supported by or tied to the clips may also be referred to as the "bundle." Non-limiting examples of items supported by or tied to the clips include one or more electrical cables, communication cables, and fiberoptic cables. The structures that the clips may be affixed or attached to include frame and rail systems for photovoltaic arrays, beams used in civil, commercial, industrial and/or residential construction, such as I-beams and H-beams, and drop-ceiling and raised floor grids.

Figure 1:
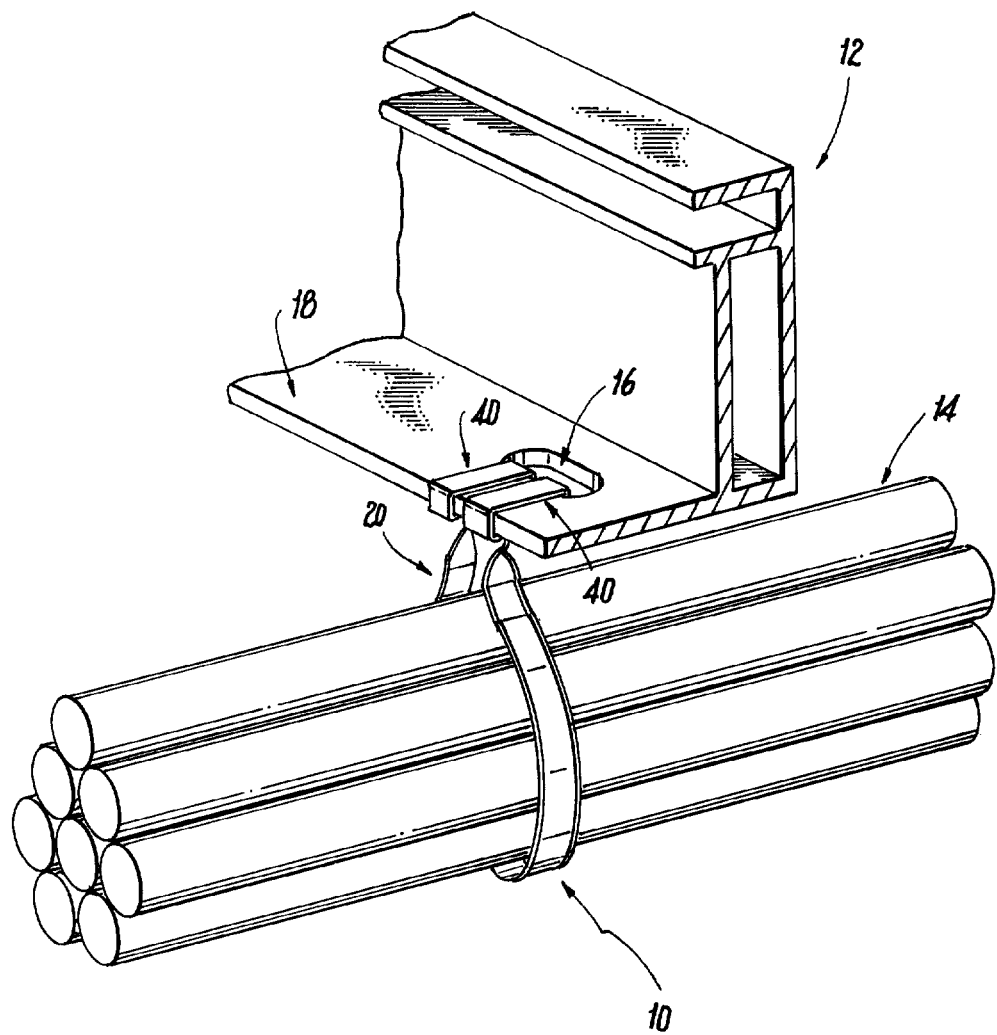
FIG. 1 is a perspective view of an exemplary embodiment of a cable clip according to the present disclosure, illustrating the cable clip releasably attached to a structure on which photovoltaic arrays are mounted with the cable clip supporting a bundle of electrical cables.
Figure 2:
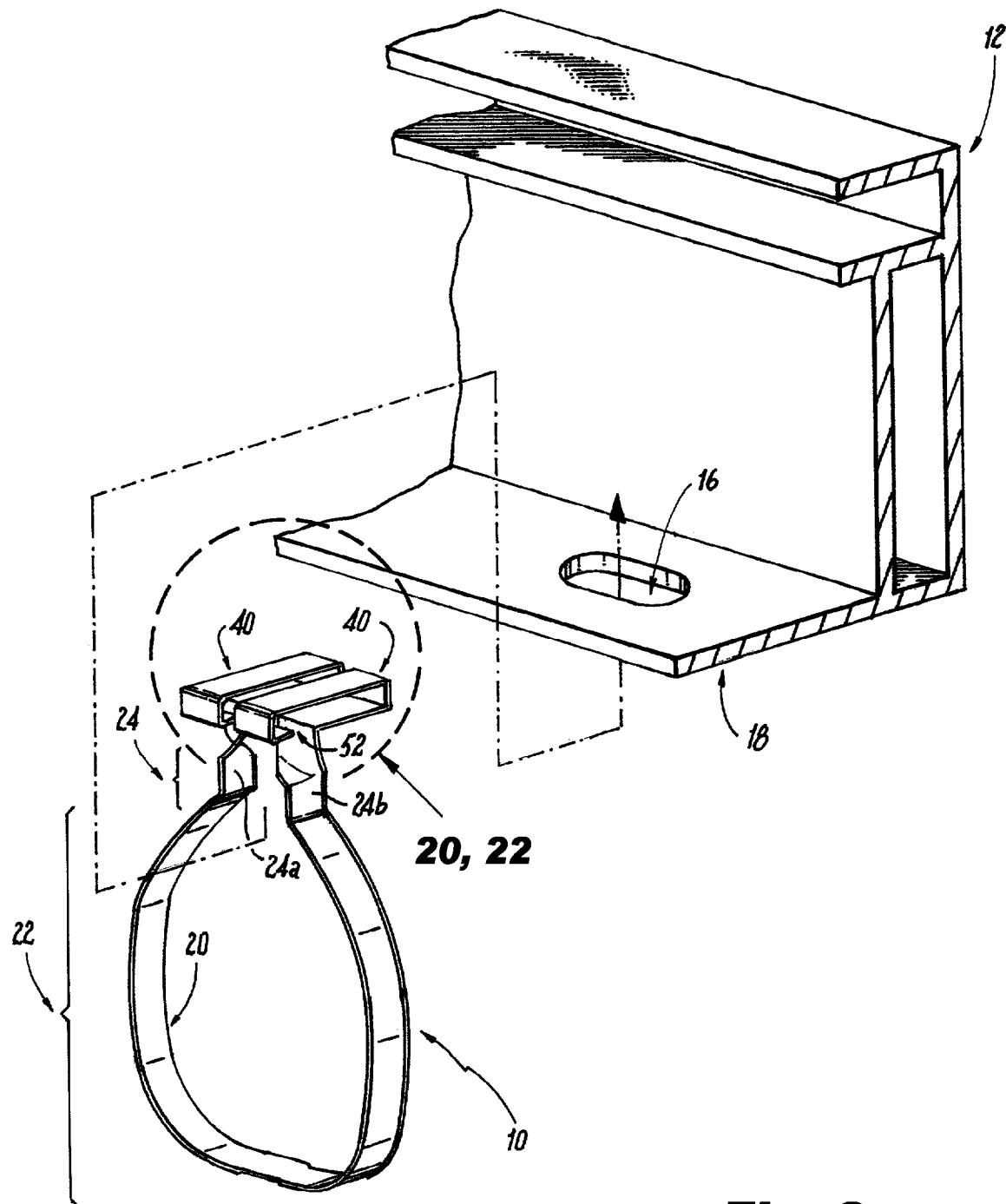
FIG. 2 is an exploded perspective of the cable clip and structure of FIG. 1 without the bundle of electrical cables.

Referring to FIGS. 1-7, an exemplary embodiment of a clip 10 according to the present disclosure is releasably attached to a structure 12 used to support a bundle 14. The structure in this exemplary embodiment is a frame system for a photovoltaic array, and the bundle 14 is a plurality of electrical cables. The clip 10 includes a bundle holding portion 20 and one or more attachment members 40. The bundle holding portion 20 may be a flexible flat strip having a rectangular or square cross-section that can be shaped to support or tie the bundle 14, seen in FIG. 7. The flat strip 20 may include rounded edges to limit or prevent damage to the items being bundled. In other embodiments, the bundle holding portion 20 may be a flexible solid or stranded rope-like structure having a circular cross-section, seen in FIG. 7A. In the exemplary embodiment shown in FIGS. 2 and 7, the bundle holding portion 20 is a flat strip having a rectangular cross-section. The bundle holding portion 20 has a pear-like shape with a bulbus portion 22 and a neck 24, as seen in FIG. 2. It is noted that one skilled in the art would appreciate that the shape of the bundle holding portion 20 may vary depending upon a number of factors, including the shape and size of the items being bundled and the quantity of items being bundled. As noted, the bundle holding portion may be a flexible structure. This flexible structure may have spring-like features where the bulbus portion 22 may be compressed with an applied force and then springs back to a normal position when the pressure is released.

The length of the bundle holding portion 20 may vary depending upon the size and quantity of items to be bundled. For example, the bundle holding portion 20 may be in the range from about 1 inch to about 8 inches in length. The thickness or diameter of the bundle holding portion 20 may also vary depending upon the load weight of the items to be bundled. In general, the durability and strength of the bundle holding portion 20 is dependent on the material that the bundle holding portion 20 is made of, as well as the thickness or diameter of the bundle holding portion. Preferably, the bundle holding portion 20 is formed of an environmentally durable metallic or non-metallic material. Non-limiting examples of metallic materials include stainless steel, galvanized steel or other corrosion resistant metals. Non-limiting examples of non-metallic materials include PV stabilized nylon 6 and nylon 12.

Figures 3, 4:
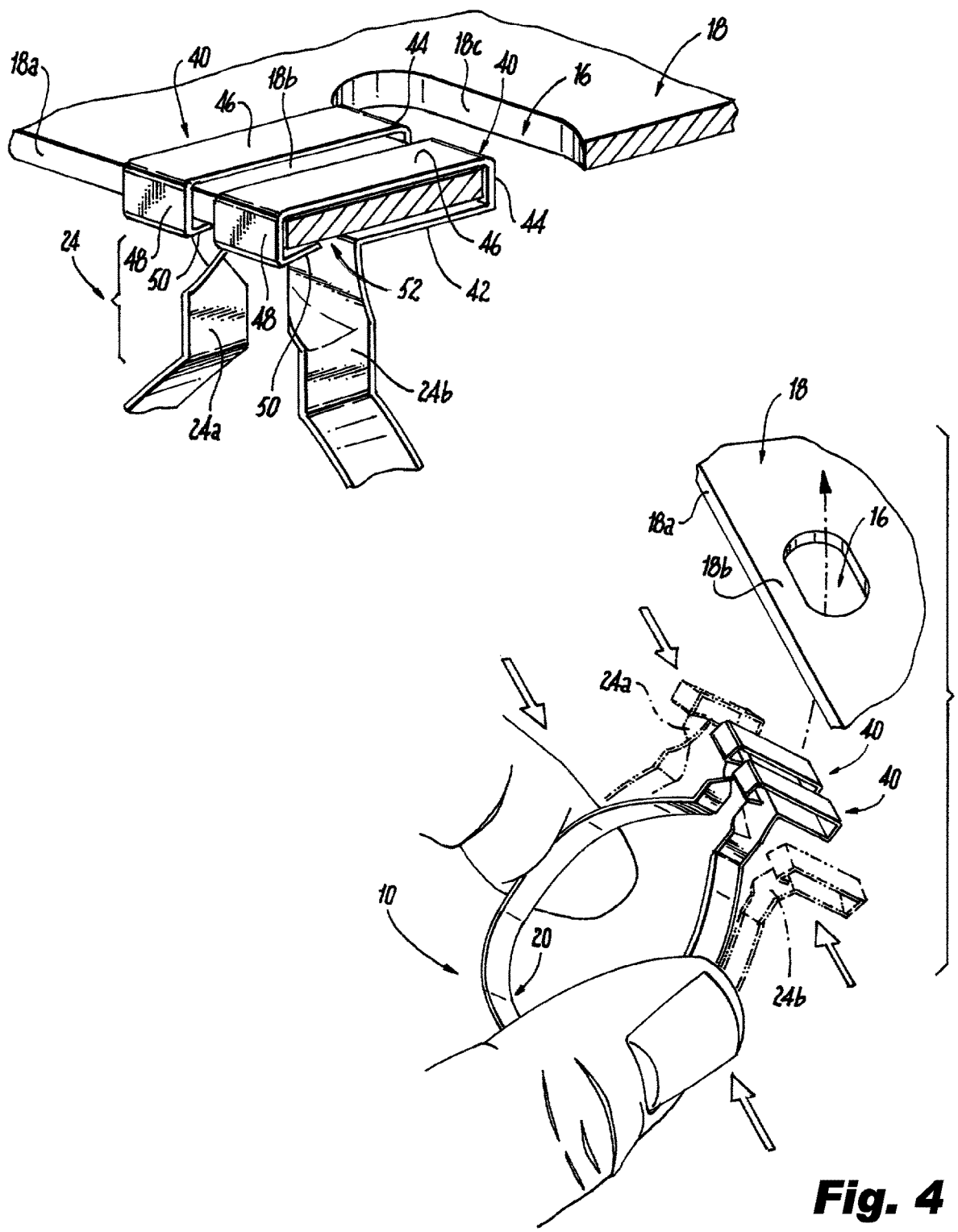
FIG. 3 is an enlarged perspective view of a portion of the cable clip and structure of FIG. 2, illustrating an exemplary embodiment of attachment members of the cable clip used to affix the cable clip to the structure.
FIG. 4 is a perspective view of cable clip and a portion of the structure of FIG. 2, illustrating the positioning of the attachment members of the cable clip for insertion into an opening in the structure.

Referring to FIG. 3, the structure of the neck 24 of the bundle holding portion 20 may vary depending upon the size and load weight of the items to be bundled. The neck 24 is configured to connect the bulbus portion 22 of the bundle holding portion 20 to the attachment members 40 to provide a desired separation between the bundle holding portion 20 and the structure wall 18. The desired separation between the bundle holding portion 20 and the structure wall 18 should at least be sufficient to permit the attachment member 40 to pass through the opening 16 in the structure wall 18 and slide onto and engage the structure wall 18 as described below. Depending upon the structure of the attachment member 40, the shape of the neck 24 may be twisted as shown in FIG. 3 to position the attachment member 40 to pass through the opening 16 in the structure wall 18 and slide onto and engage the structure wall 18. The thickness or diameter of the neck 24 may also vary based upon the load weight of the items to be bundled. In general, the durability and strength of the neck 24 is dependent on the material that the neck 24 is made of, as well as the thickness or diameter of the neck. Preferably, the neck 24 is formed of an environmentally durable metallic or non-metallic material. Non-limiting examples of metallic materials include stainless steel, galvanized steel or other corrosion resistant metals. Non-limiting examples of non-metallic materials include PV stabilized nylon 6, nylon 12.

Referring to FIGS. 2 and 3, each end 24a and 24b of the neck 24 of the bundle holding portion 20 has an attachment member 40 that may be integrally or monolithically formed into the respective end 24a or 24b. In another embodiment, the attachment member 40 may be secured to the respective end 24a or 24b by for example welds, adhesives, crimping or mechanical fasteners. The attachment member 40 may be in the form of a hook that can pass through the opening 16 in the wall 18 of the structure 12, as seen in FIG. 2, and releasably affix to or attach to the structure wall 18, as seen in FIG. 3. In the embodiment shown, the attachment member 40 is a rectangular or square hook-like structure having a lower wall 42 with a first end joined to or monolithically formed into the neck 24 and a second end joined to or monolithically formed into a first end of a first side wall 44. An upper wall 46 has a first end joined to or monolithically formed into a second end of the first side wall 44 and a second end joined to or monolithically formed into a first end of a second side wall 48. The upper wall 46 is preferably parallel to the lower wall 42 and perpendicular to the side walls 44 and 48. A lip 50 has one end joined to or monolithically formed into a second end of the second side wall 48 and a free end extending in the direction of the first side wall 44, as shown in FIG. 3. The lip 50 may be perpendicular to the side wall 48 or the lip 50 may be at an angle, e.g., an acute angle, relative to the side wall 48 to enable the lip 50 to engage the portion 18b of the structure wall 18, seen in FIG. 4, to improve the attachment of the clip 10 to the structure 12. In this configuration, a gap 52 is formed between the lower wall 42 and the lip 50, and a pocket 54 is formed between the lower wall 42, the upper wall 46, the side walls 44 and 48, and the lip 50. The gap 52 permits the attachment members 40 to pass through the opening 16 in the structure wall 18, seen in FIG. 4, so that pocket 54 can receive a portion 18b of the structure wall 18 between the opening 16 and an outer edge 18a of the structure wall 18 to releasably affix or attach the clip 10 to the structure 12.

Figure 5:
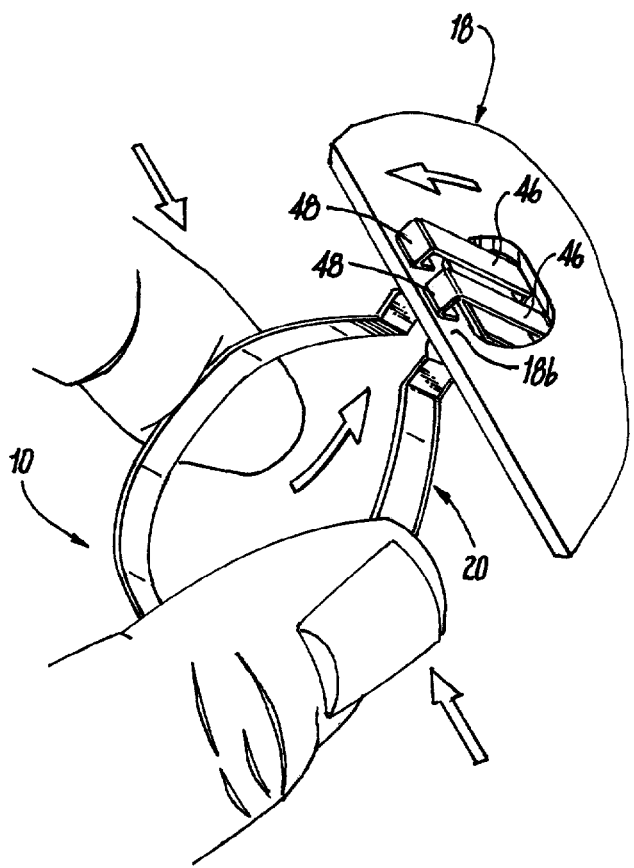
FIG. 5 is a perspective view of cable clip and the portion of the structure of FIG. 4, illustrating the insertion of the attachment members of the cable clip into the opening in the structure.
Figure 6:
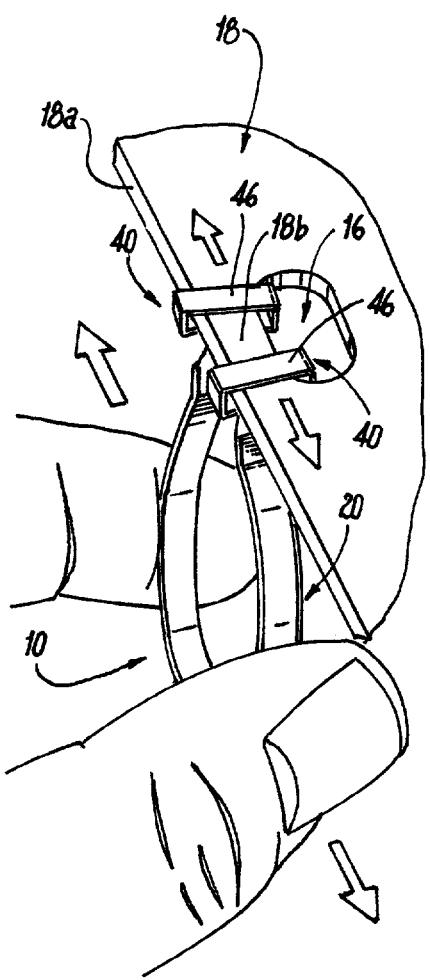
FIG. 6 is a perspective view of cable clip and the portion of the structure of FIG. 5, illustrating the attachment members of the cable clip in the opening in the structure.
Figure 7:
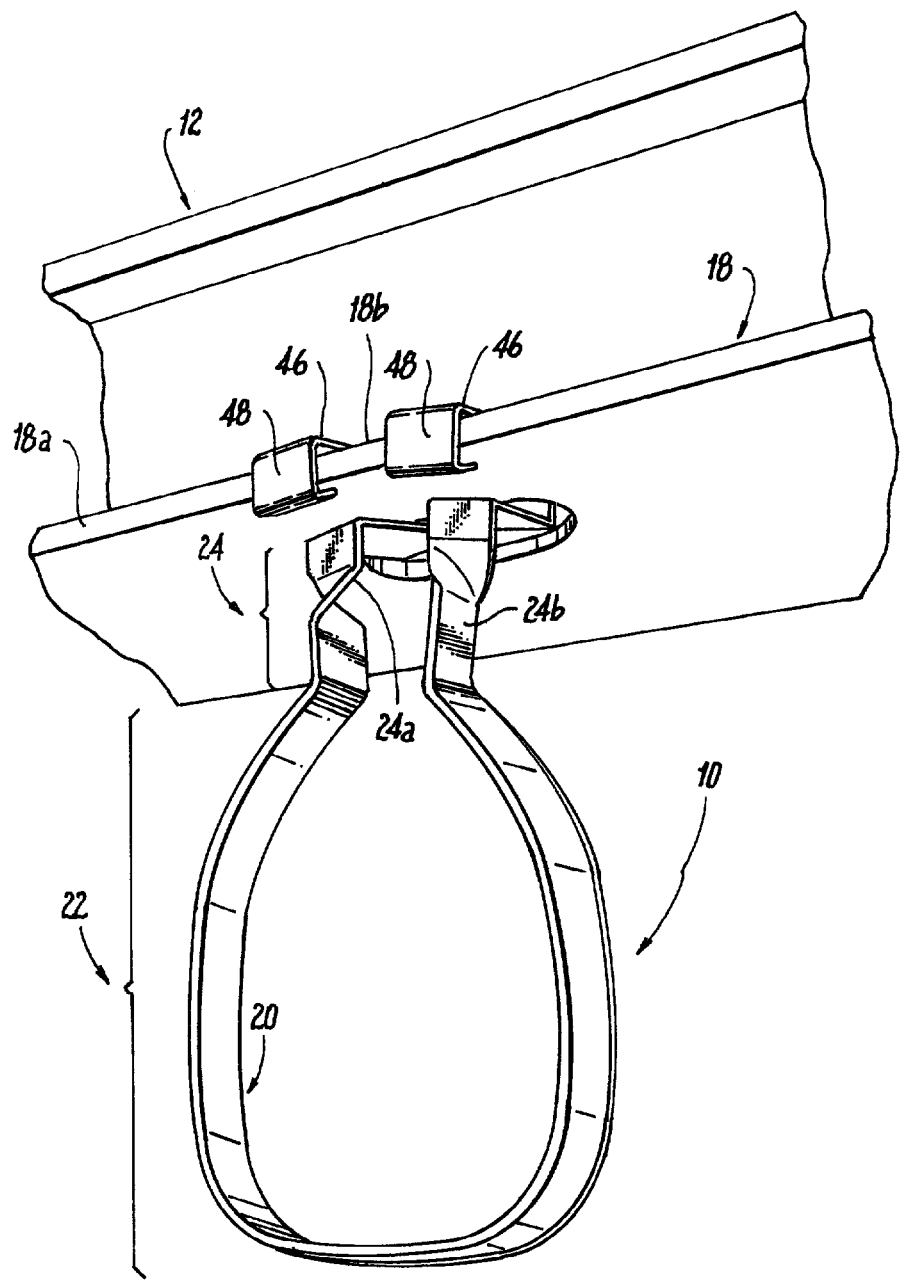
FIGS. 7 and 7A are bottom perspective views of the cable clip and structure of FIG. 6, illustrating the attachment members of the cable clip releasably attached to the structure, and illustrating a bundle holding portion having a flexible flat strip in FIG. 7 and a bundle holding portion having a flexible rope-like structure in FIG. 7A.
Figure 7A:
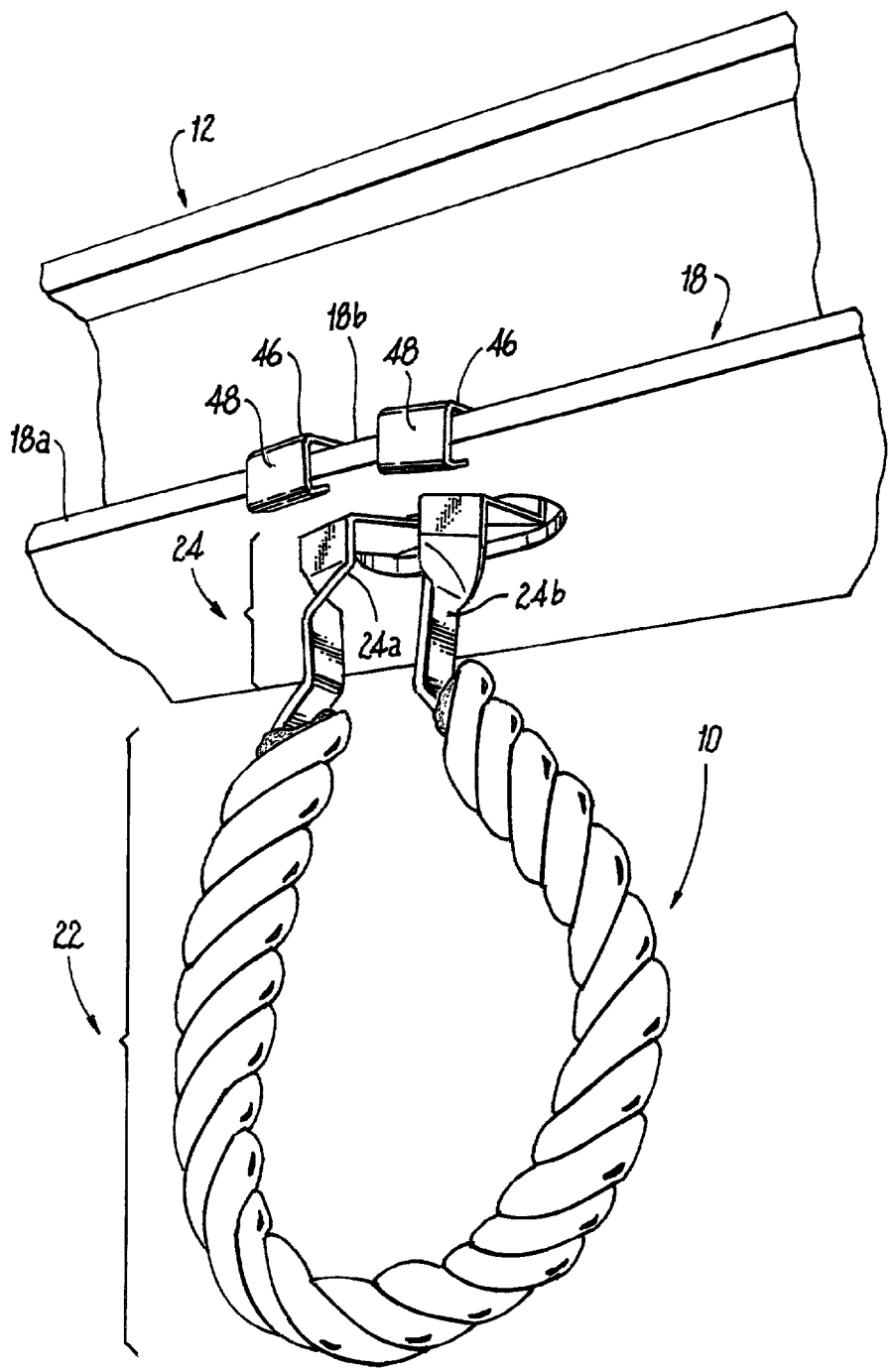

The attachment of the clip 10 to a structure 12 will be described with reference to FIGS. 4-7. Initially, the bundle holding portion 20 is pinched together so that separation between the attachment members 40 is reduced, as shown in FIG. 4. Reducing the separation between the attachment members 40 permits the attachment members to be inserted through the opening 16 in the structure wall 18. To insert the attachment members 40 through the opening 16, the bundle holding portion 20 is pivoted or rotated and the side walls 48 of each attachment member 40 are inserted into the opening 16 in the structure wall 18 such that the portion 18b of the structure wall 18 passes through the gaps 52 of each attachment member 40. Continued insertion of the attachment members 40 into the opening 16 causes the portion 18b of the structure wall 18 to be received within the pockets 54, as seen in FIGS. 5 and 6, until the side wall 48 and lip 50 of each attachment member 40 captures or grips the portion 18b of the structure wall 18. The bundle holding portion 20 is then released permitting the neck 24 to return to its normal, un-biased position where the distance between the attachment members 40 increases, as seen in FIG. 6, so that the side walls 48 of each attachment member 40 contact the outer edge 18a of the structure wall 18 and the lips 50 of each attachment member grip or engage a bottom surface of the portion 18b of the structure wall 18, as seen in FIG. 7, to hold the clip 10 in place on the structure wall 18.

Figure 8:
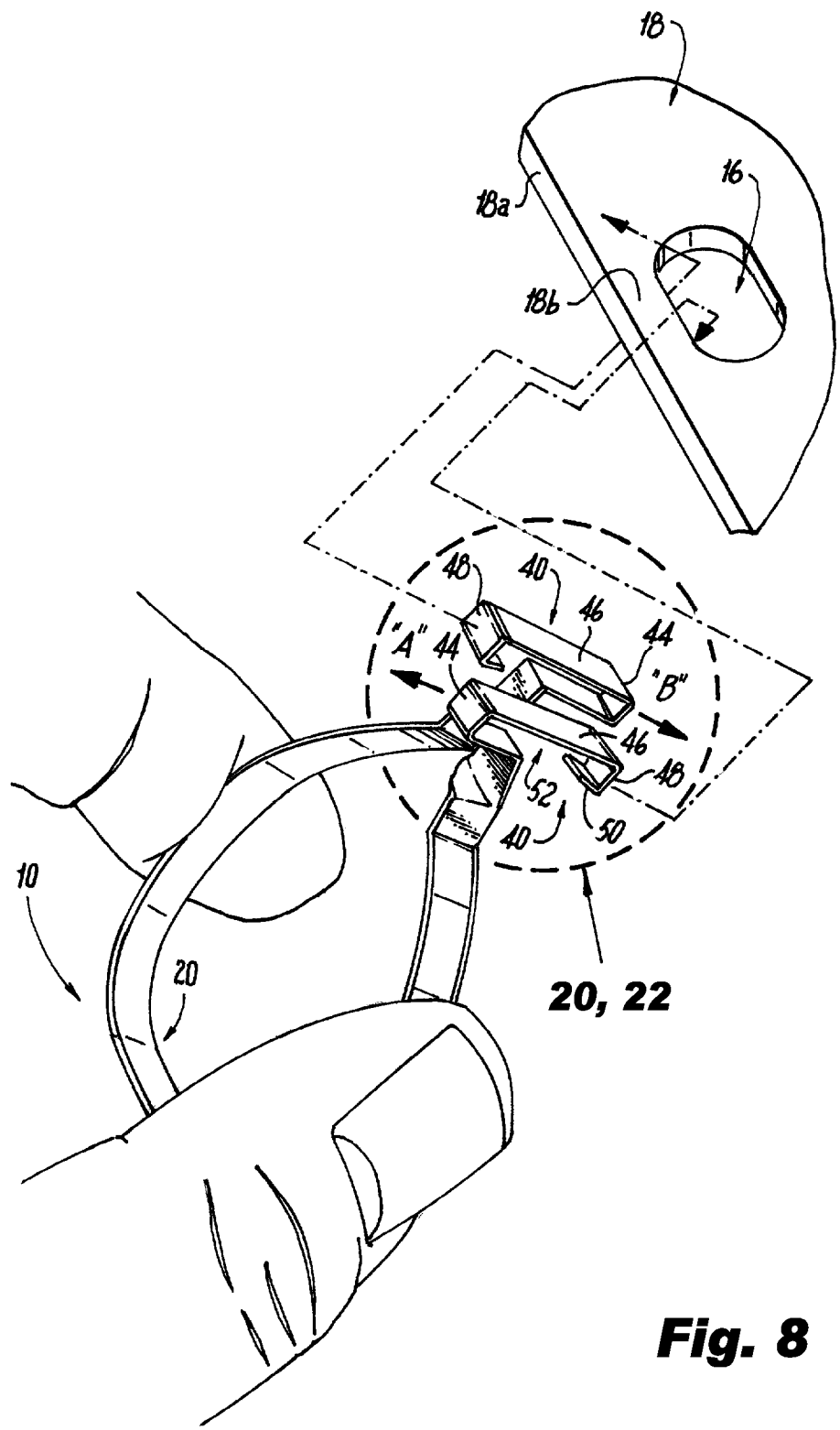
FIG. 8 is a perspective view of another exemplary embodiment of the cable clip according to the present disclosure, illustrating another exemplary embodiment of the attachment members used to affix the cable clip to the structure.
Figure 9:
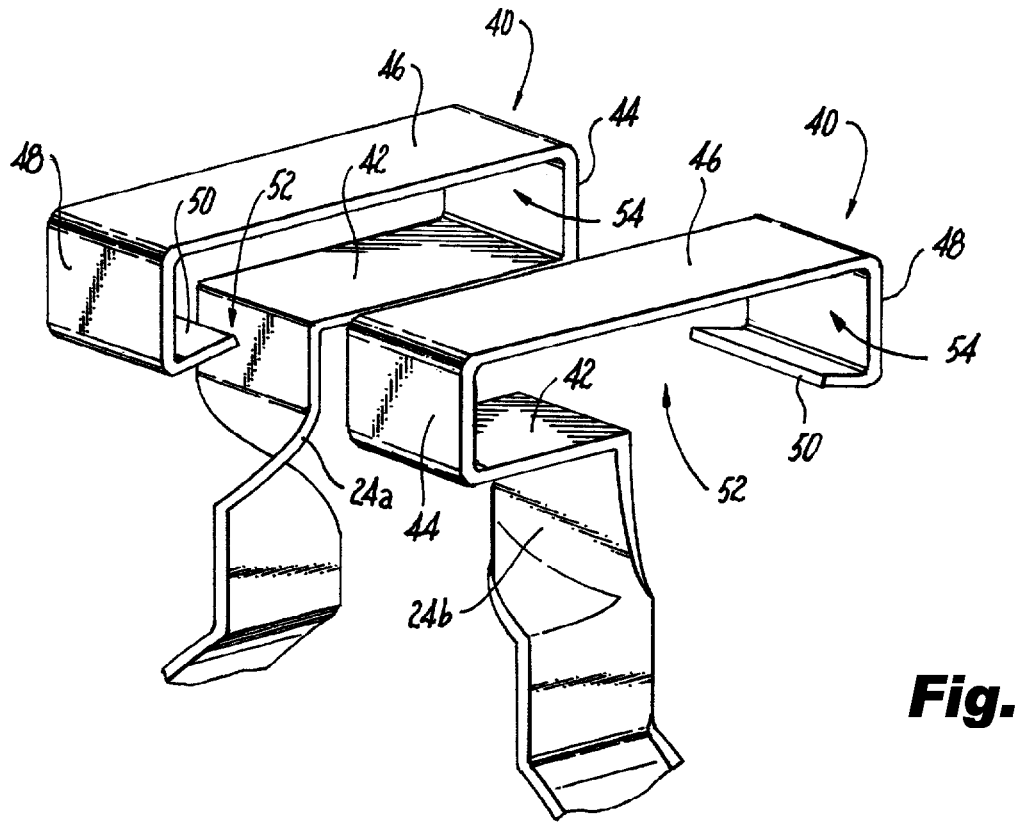
FIG. 9 is an enlarged perspective view of the attachment members of FIG. 8.
Figure 10:
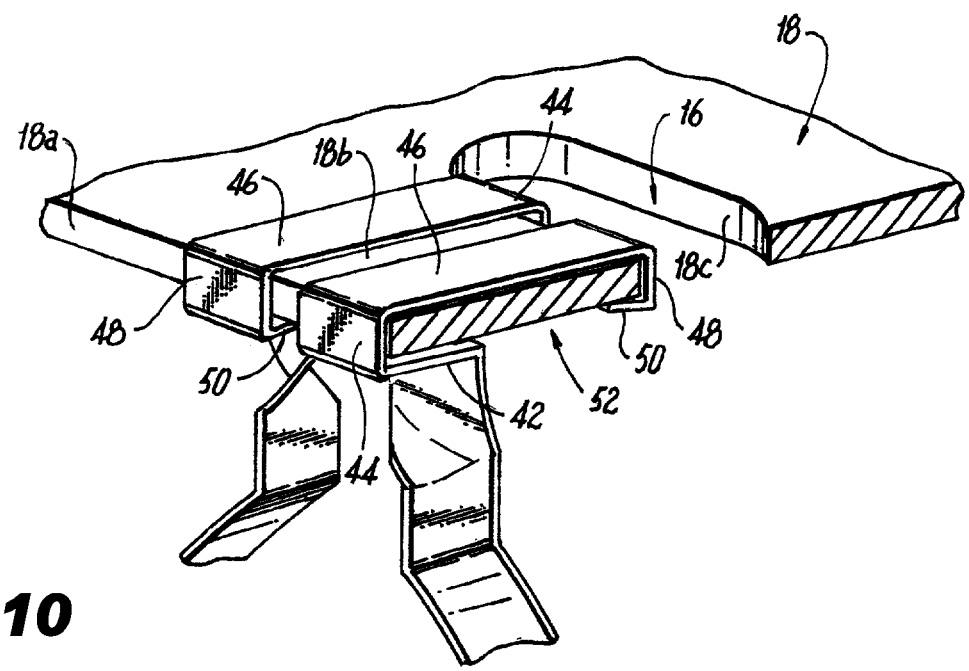
FIG. 10 is an enlarged perspective view of the attachment members of FIG. 9 installed in the opening in the structure.

Referring now to FIGS. 8-10, another exemplary embodiment for the attachment members 40 that may be integrally or monolithically formed into the respective end 24a or 24b of the neck 24, or that may be secured to the respective end 24a or 24b of the neck 24 by for example welds, adhesives, crimping or mechanical fasteners will be described. The attachment members 40 are the same as the attachment members described above. However, in this exemplary embodiment, the attachment members 40 are oriented differently relative to their respective end 24a or 24b on the neck 24. More specifically, the attachment members 40 are oriented relative to each other so that the side walls 48 extend in opposite directions relative to the neck 24, as shown in FIGS. 8 and 9. The attachment of the clip 10 to a structure 12 according to this exemplary embodiment will be described with reference to FIGS. 8 and 10. Initially, the bundle holding portion 20 is pinched together so that separation between the attachment members 40 is reduced, as shown in FIG. 8. In addition, the attachment members 40 are moved in the directions of arrows "A" and "B." Reducing the separation between the attachment members 40 and further separating the attachment members 40 by moving them in the directions of arrows "A" and "B" respectively permits two actions. First, the side wall 48 of the first attachment member 40 can be inserted through the opening 16 in the structure wall 18 when the bundle holding portion 20 is pivoted or rotated and the portion 18b of the structure wall 18 passes through the gap 52 of the first attachment member 40 and is received within the pocket 54, as shown in FIG. 8, and the lip 50 and side wall 48 engage the outer edge 18a and portion 18b of the structure wall 18. Second, the outer edge 18a of the structure wall 18 can be passed through the gap 52 in the second attachment member 40 and is received within the pocket 54, as shown in FIG. 8, and the lip 50 passes through the opening 16 in the structure wall 18 so that the side wall 48 and lip 50 capture the portion 18b of the structure wall 18. The bundle holding portion 20 is then released permitting the neck 24 to return to its normal, un-biased position where the distance between the attachment members 40 increases so that the lip 50 and side wall 48 of the first attachment member 40 contacts or engages the outer edge 18a of the structure wall 18 to hold the attachment member 40 in place on the structure wall 18. In addition, the lip 50 and side wall 48 of the second attachment member 40 contacts or engages an inner edge 18c of the structure wall 18 associated with the opening 16 to hold the attachment member 40 in place on the structure wall 18.

Figure 11:
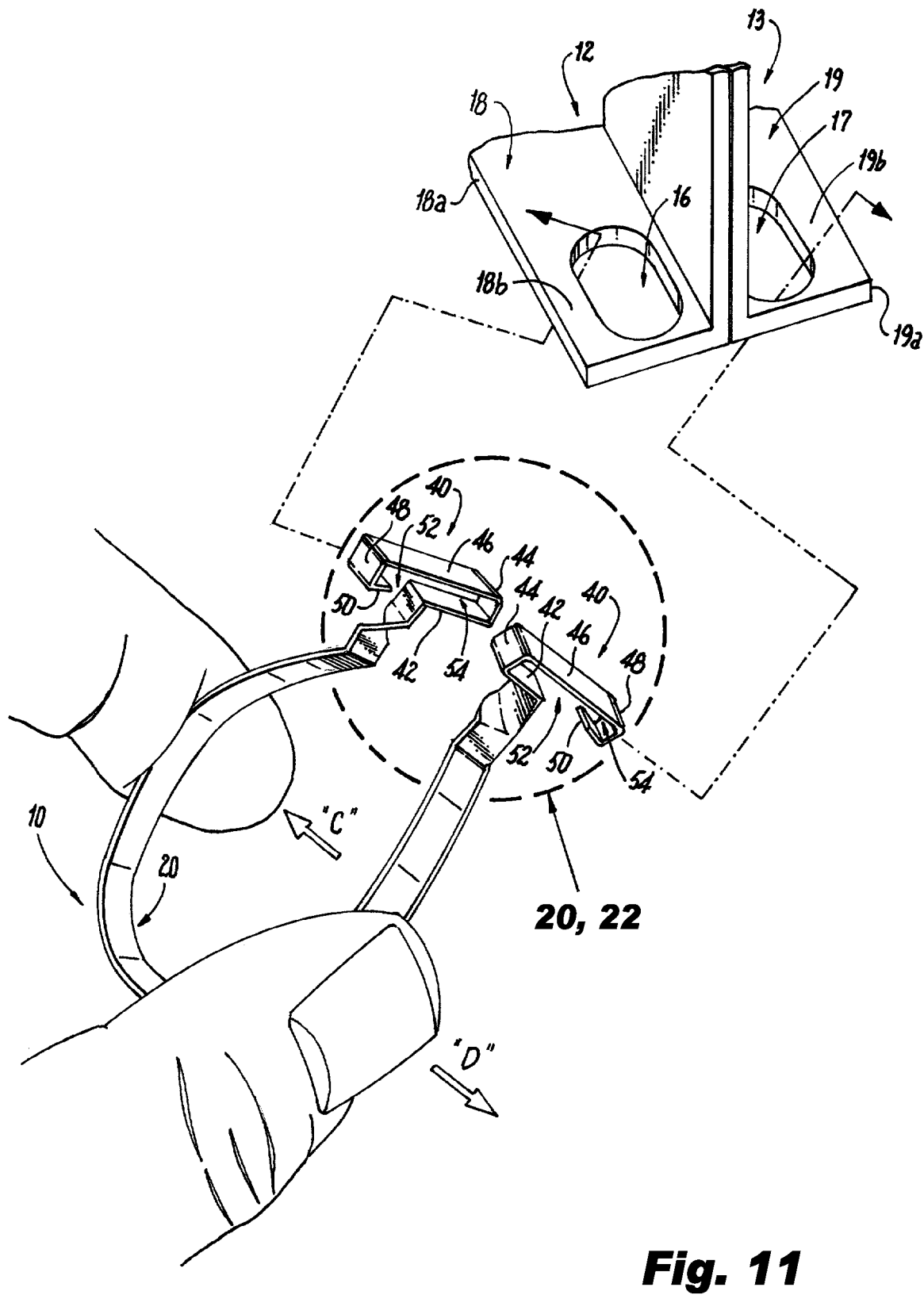
FIG. 11 is a perspective view of another exemplary embodiment of the cable clip according to the present disclosure, illustrating the cable clip releasably attached to and spanning two structures.
Figure 12:
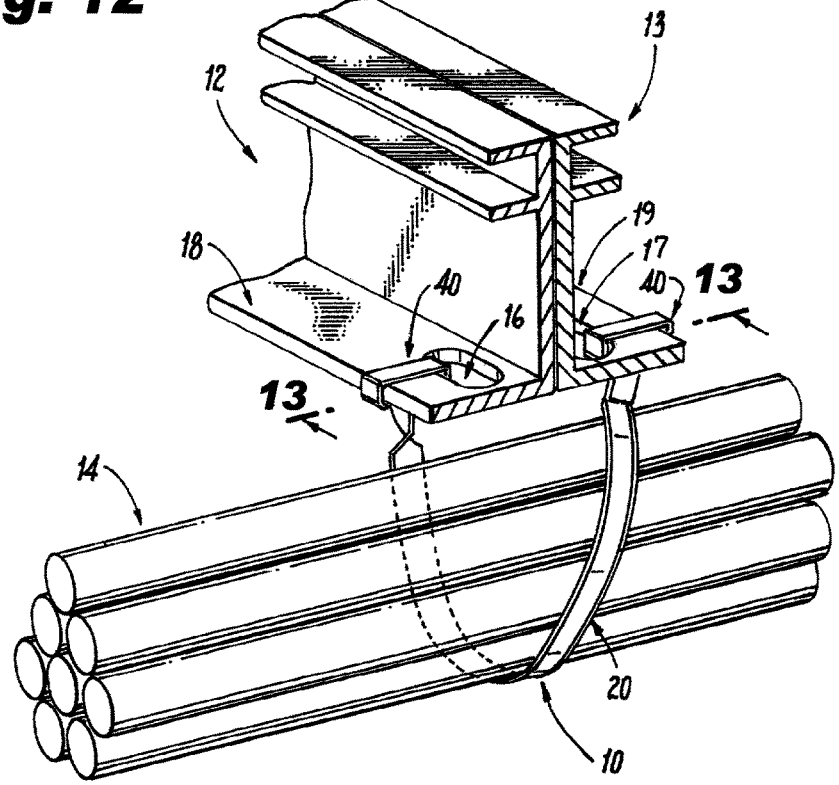
FIG. 12 is an enlarged perspective of the cable clip of FIG. 11 releasably attached to the structures with the cable clip supporting a bundle of electrical cables.
Figure 13:
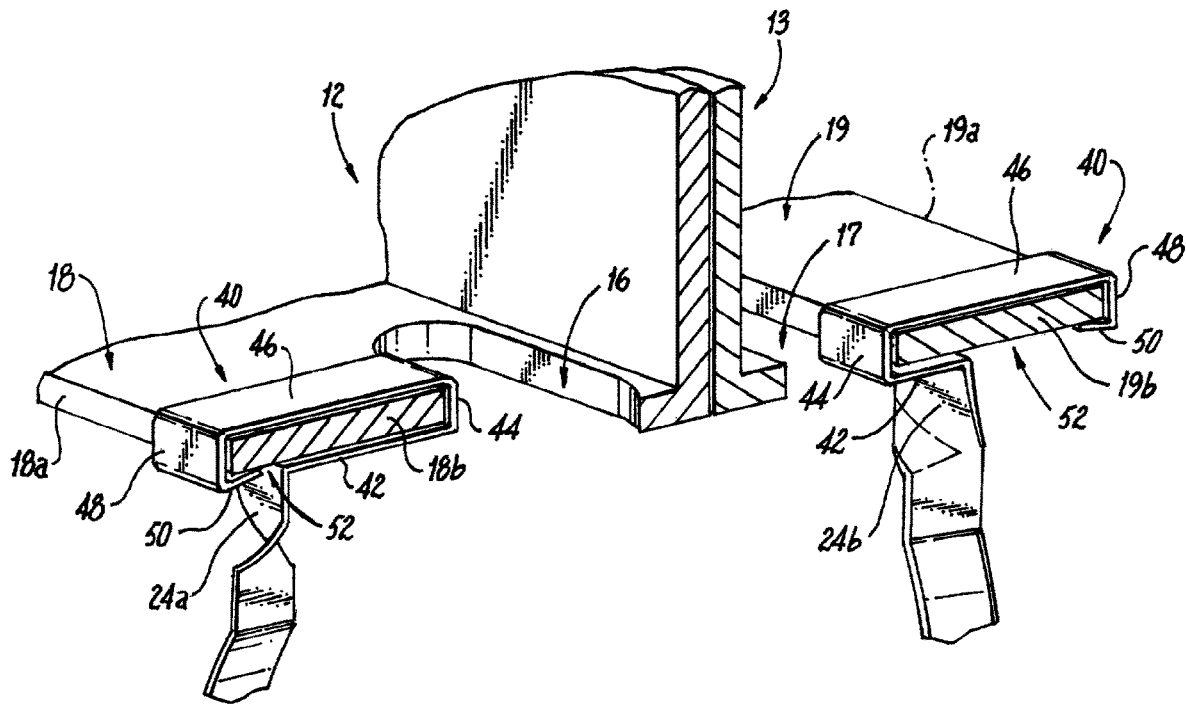
FIG. 13 is a cross-sectional view of the cable clip and structure of FIG. 12 taken from line 13-13.

Referring now to FIGS. 11-13, the attachment members 40 of FIGS. 8 and 9 may be attached to adjacent structures 12 and 13 to support a bundle 14. To attach the attachment members 40 to adjacent structures 12 and 13, the bundle holding portion 20 is initially moved in the directions of arrows "C" and "D" as shown in FIG. 11. The side wall 48 of the first attachment member 40 is then inserted through the opening 16 in the first structure wall 18 and the portion 18b of the first structure wall 18 passes through the gap 52 of the first attachment member 40 and is received within the pocket 54, as shown in FIGS. 12 and 13. The lip 50 and side wall 48 can then engage the outer edge 18a and portion 18b of the first structure wall 18. The side wall 48 of the second attachment member 40 can then be inserted through an opening 17 in a second structure wall 19 and a portion 19b of the second structure wall 19 pass through the gap 52 of the second attachment member 40 and is received within the pocket 54, as shown in FIGS. 12 and 13. The lip 50 and side wall 48 of the second attachment member 40 can then engage the outer edge 19a and portion 19b of the second structure wall 19.

Figure 14:
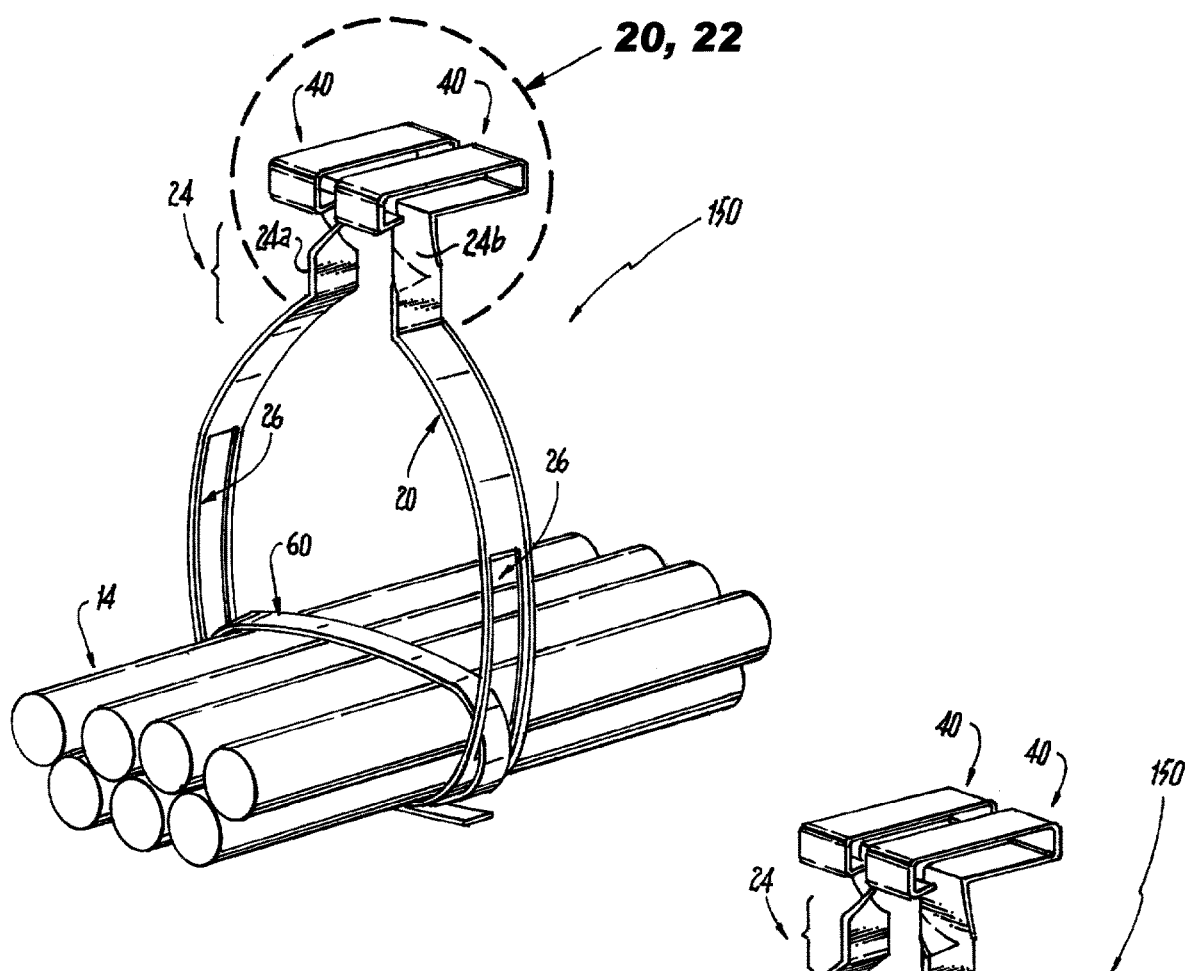
FIG. 14 is a perspective view of another exemplary embodiment of a cable clip according to the present disclosure, illustrating an exemplary embodiment of a bundle tightener operatively coupled to a strap portion of the cable clip used when supporting smaller sized cable bundles.
Figure 15:
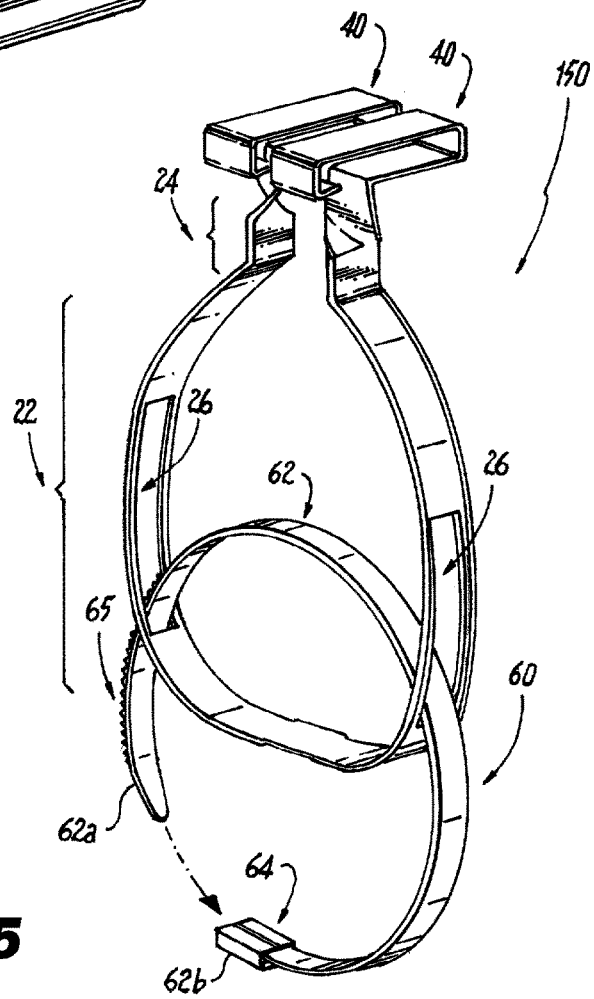
FIG. 15 is a perspective of the cable clip of FIG. 14, illustrating the association of the bundle tightener relative to the cable clip.

Referring now to FIGS. 14 and 15, another exemplary embodiment of a clip 150 according to the present disclosure is shown. The clip 150 includes a bundle holding portion 20, one or more attachment members 40 and a bundle tie 60. The bundle holding portion 20 is substantially similar to the bundle holding portion described above, except that the flexible flat strip having a rectangular or square cross-section, seen in FIG. 7, or the flexible solid or stranded rope-like structure having a circular cross-section, seen in FIG. 7A, of the bulbus portion 22 may include one or more openings 26, e.g., slots, that receive the bundle tie 60 to permit the clip 150 to snuggly or tightly support bundles of different sizes. In this exemplary embodiment, the attachment members 40 are the same as the attachment members described herein and a description thereof is not repeated. The bundle tie 60 has strap 62 and a fastening system 64. The strap 62 has a free end 62a and head 62b. The fastening system 64 is configured to fixedly or releasably join the free end 62a of the strap 62 to the head 62b. As such, the fastening system 64 may be associated with both the free end 62a and the head 62b of the strap 62, or the fastening system 64 may be associated with one end of the strap 62. In the embodiment of FIGS. 14 and 15, the fastening system 64 includes teeth 65 on the free end 62a of the strap 62 that engage with a pawl (not shown) in the head 62b to form a ratchet so that as the free end 62a of the strap 62 is pulled through the head 62b, the strap 62 tightens and the free end 62a is prevented from being withdrawn from the head 62b. As shown in FIG. 14, when the strap 62 is tightened, the bundle 14, which is a small bundle, is snugly or tightly affixed to the clip 150 depending upon how tight the strap 62 is tightened.

Figure 16:
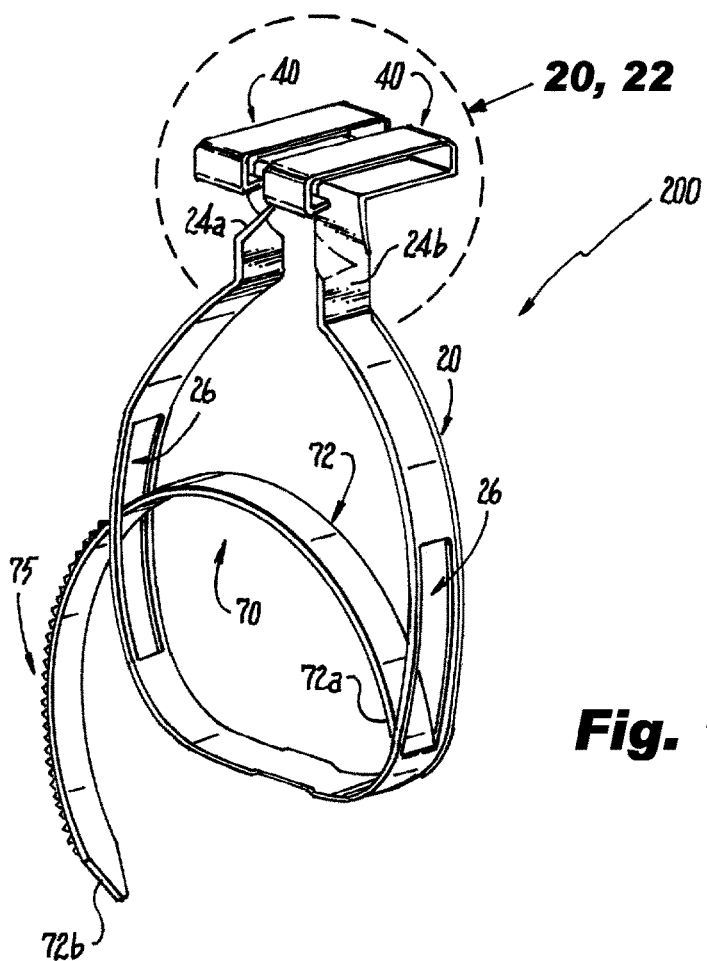
FIG. 16 is a perspective view of another exemplary embodiment of a cable clip according to the present disclosure, illustrating another exemplary embodiment of a bundle tightener according to the present disclosure.
Figure 17:
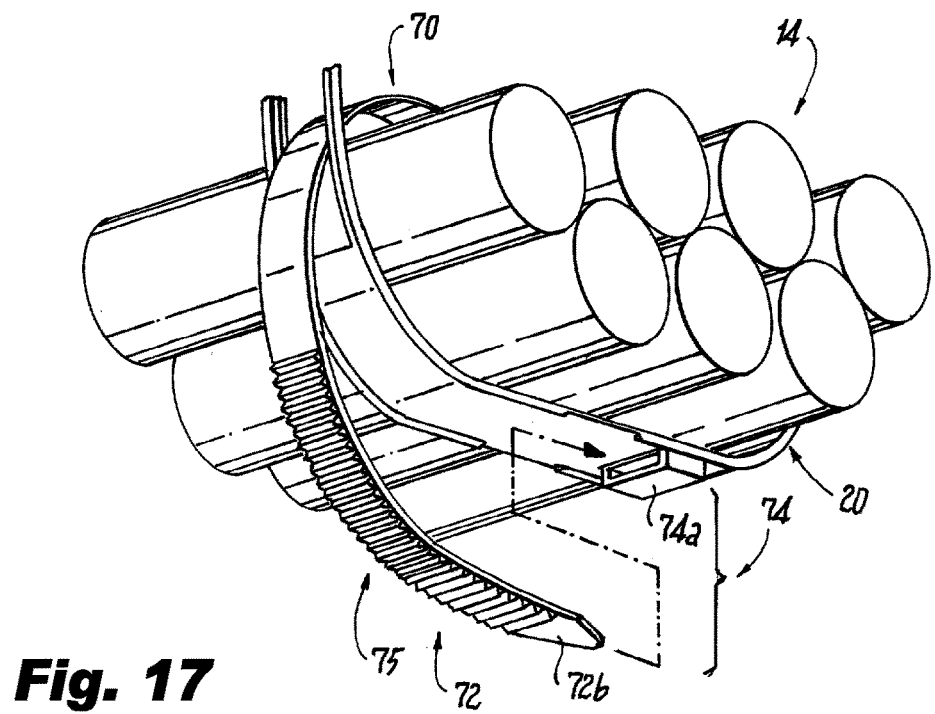
FIG. 17 is a bottom perspective view of the cable clip of FIG. 16, illustrating the bundle tightener securing a smaller cable bundle to the cable clip.

Referring to FIGS. 16 and 17, another exemplary embodiment of a clip 200 according to the present disclosure is shown. The clip 200 includes a bundle holding portion 20, one or more attachment members 40 and a bundle tie 70. The bundle holding portion 20 is substantially similar to the bundle holding portion described above, except that the flexible flat strip having a rectangular or square cross-section, seen in FIG. 7, or the flexible solid or stranded rope-like structure having a circular cross-section, seen in FIG. 7A, of the bulbus portion 22 may include one or more openings 26, e.g., slots, that at least partially receive the bundle tie 70 to permit the clip 200 to snuggly or tightly support bundles of different sizes. In this exemplary embodiment, the attachment members 40 are the same as the attachment members described herein and a description thereof is not repeated. The bundle tie 70 has strap 72 and a fastening system 74. The strap 72 has one end 72a integrally or monolithically formed into the bulbus portion 22 of the bundle holding portion 20, or secured to the bulbus portion 22 via welds, adhesives, crimping or mechanical fasteners. The junction between the end 72a of the strap 72 and the bulbus portion 22 may be a hinge junction allowing the strap 72 to pivot relative to the bulbus portion. The second end 72b of the strap is a free end. The fastening system 74 is configured to fixedly or releasably join the free end 72b of the strap 72 to the bulbus portion 22 of the bundle holding portion 20. As such, the fastening system 74 may be associated with both the free end 72b of the strap and the bulbus portion 22 of the bundle holding portion 20, or the fastening system 74 may be associated with the free end 72b of the strap 72 or the bulbus portion 22 of the bundle holding portion 20. In the embodiment of FIGS. 16 and 17, the fastening system 74 includes teeth 75 on the free end 72b of the strap 72 that engage with a pawl (not shown) in a head 74a on the bulbus portion 22 of the bundle holding portion 20. The head 74a may be integrally or monolithically formed into the bulbus portion 22 of the bundle holding portion 20, or secured to the bulbus portion 22 via welds, adhesives or mechanical fasteners. The teeth 75 and head 74a form a ratchet mechanism so that as the free end 72b of the strap 72 is pulled through the head 74a fastening system 74, the strap 72 tightens and the free end 72b is prevented from being withdrawn from the head 74a. As shown in FIG. 17, when the strap 72 is tightened, the bundle 14, which is a small bundle, is snugly or tightly affixed to the clip 200 depending upon how tight the strap 72 is tightened.

Figure 18:
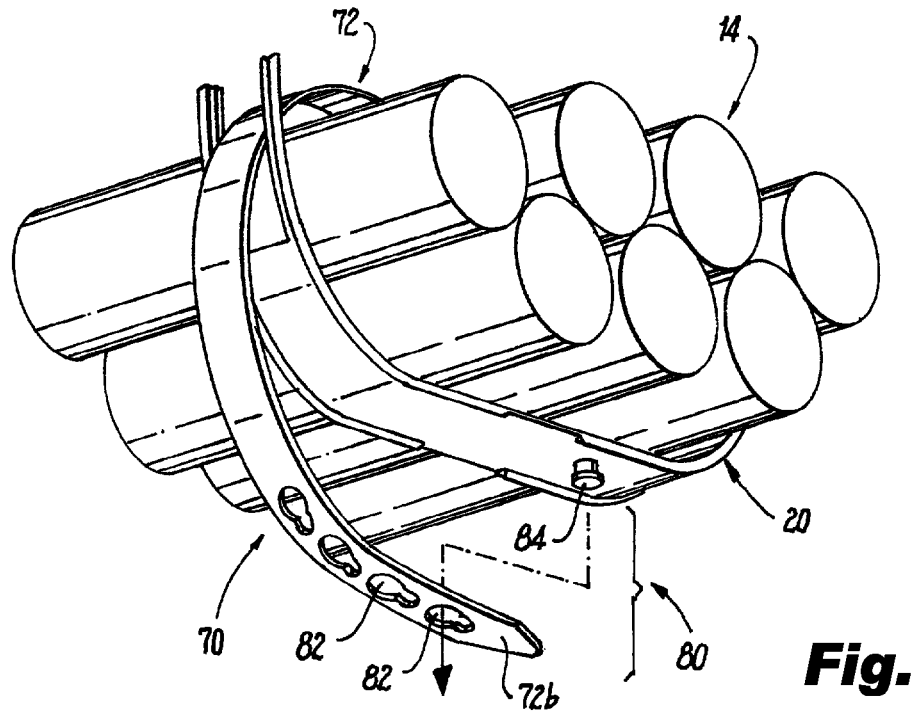
FIG. 18 is a bottom perspective view of the cable clip similar to FIG. 16, illustrating another exemplary embodiment of the bundle tightener according to the present disclosure securing a smaller cable bundle to the cable clip.

Referring to FIG. 18, another exemplary embodiment of a fastening system 80 that can be used with the bundle tie 60 or 70 of the present disclosure is shown. The fastening system according to this exemplary embodiment will be described with reference to the bundle tie 70 described above, but one skilled in the art would readily appreciate that the fastening system 80 according to this exemplary embodiment can be used with the bundle tie 60. In this exemplary embodiment, the fastening system 80 is configured to fixedly or releasably join the free end 72b of the strap 72 to the bulbus portion 22 of the bundle holding portion 20. As such, the fastening system 80 may be associated with both the free end 72b of the strap and the bulbus portion 22 of the bundle holding portion 20, or the fastening system 80 may be associated with the free end 72b of the strap 72 or the bulbus portion 22 of the bundle holding portion 20. In the embodiment of FIG. 18, the fastening system 80 includes one or more keyholes 82, e.g., pear-shaped holes, on the free end 72*b* of the strap 72 that engage with a flanged stud 84 extending from the bundle holding portion 20, as shown. The flanged stud 84 may be integrally or monolithically formed into the bulbus portion 22 of the bundle holding portion 20, or secured to the bulbus portion 22 via welds, adhesives or mechanical fasteners. Depending upon the size of the bundle 14, the flanged stud 84 is inserted into the appropriate keyhole 82 so that the free end 72*b* of the strap 72 is attached to the flanged stud 84 of the fastening system 80. The particular keyhole 82 in which the flanged stud 84 is inserted depends upon the desired snugness or tightness of the bundle 14 relative to the clip 200.

Figure 19:
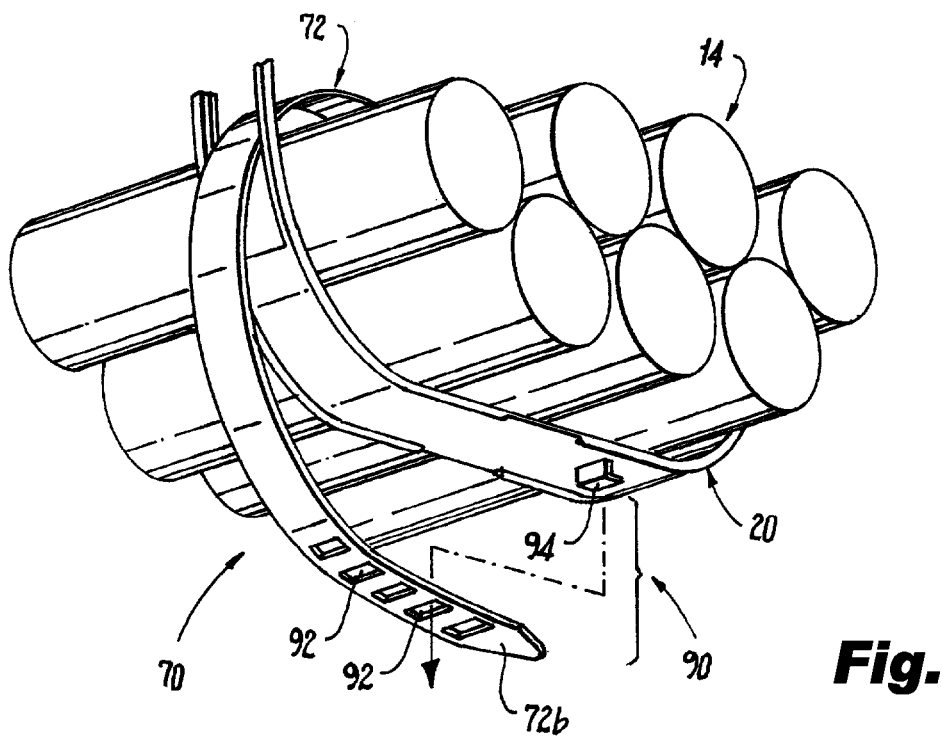
FIG. 19 is a bottom perspective view of the cable clip similar to FIG. 16, illustrating another exemplary embodiment of the bundle tightener according to the present disclosure securing a smaller cable bundle to the cable clip.
Figure 20:
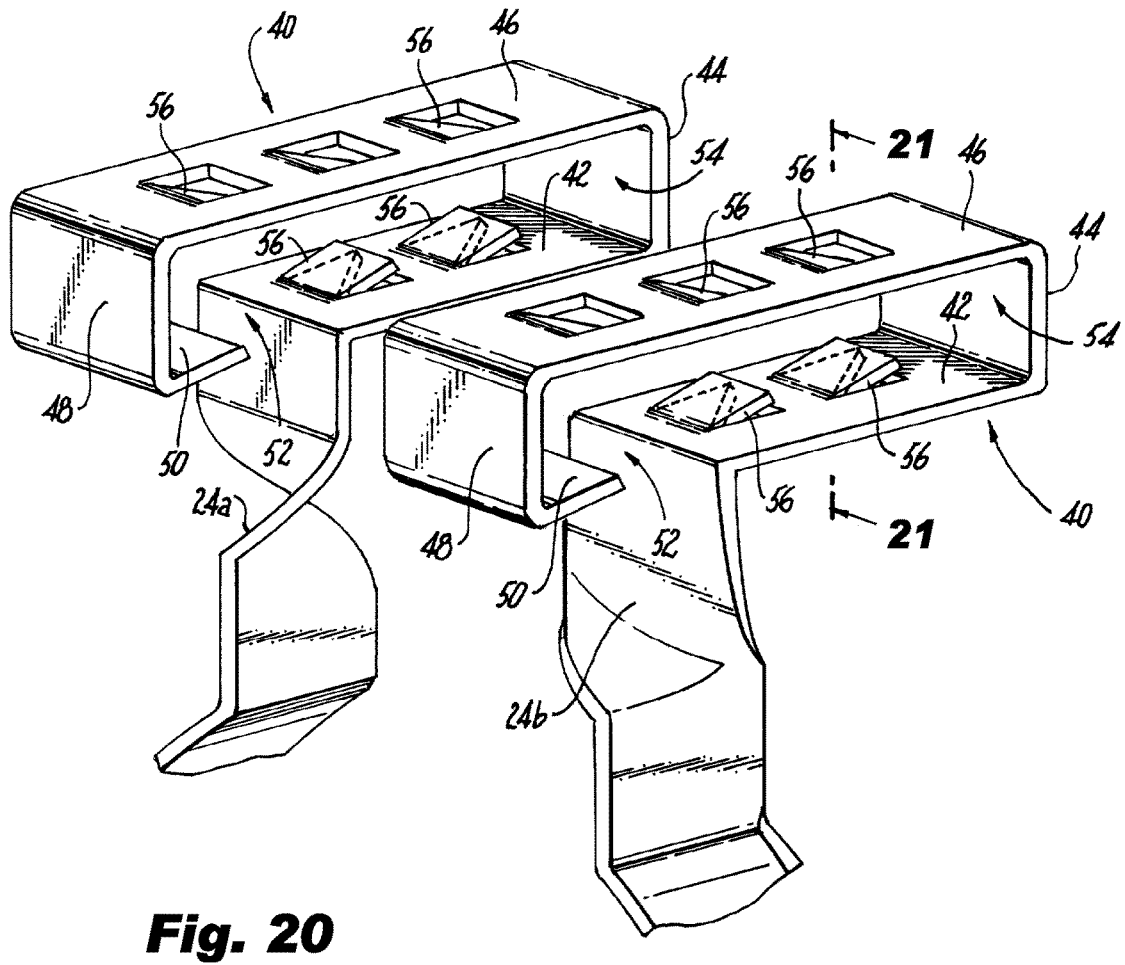
FIG. 20 is an enlarged perspective view of another exemplary embodiment of the attachment members according to the present disclosure, illustrating a plurality of protruding members extending from the walls of each attachment member into a pocket of each attachment member.
Figure 21:
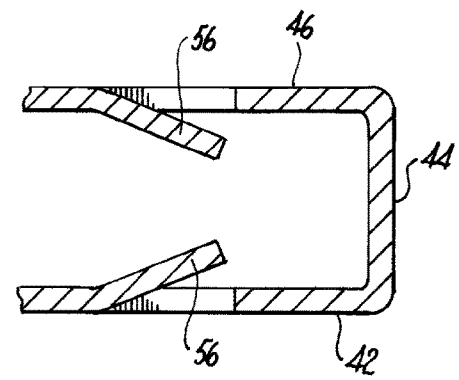
FIG. 21 is a cross-sectional view of one of the attachment members of FIG. 20 taken from line 21-21.
Figure 22:
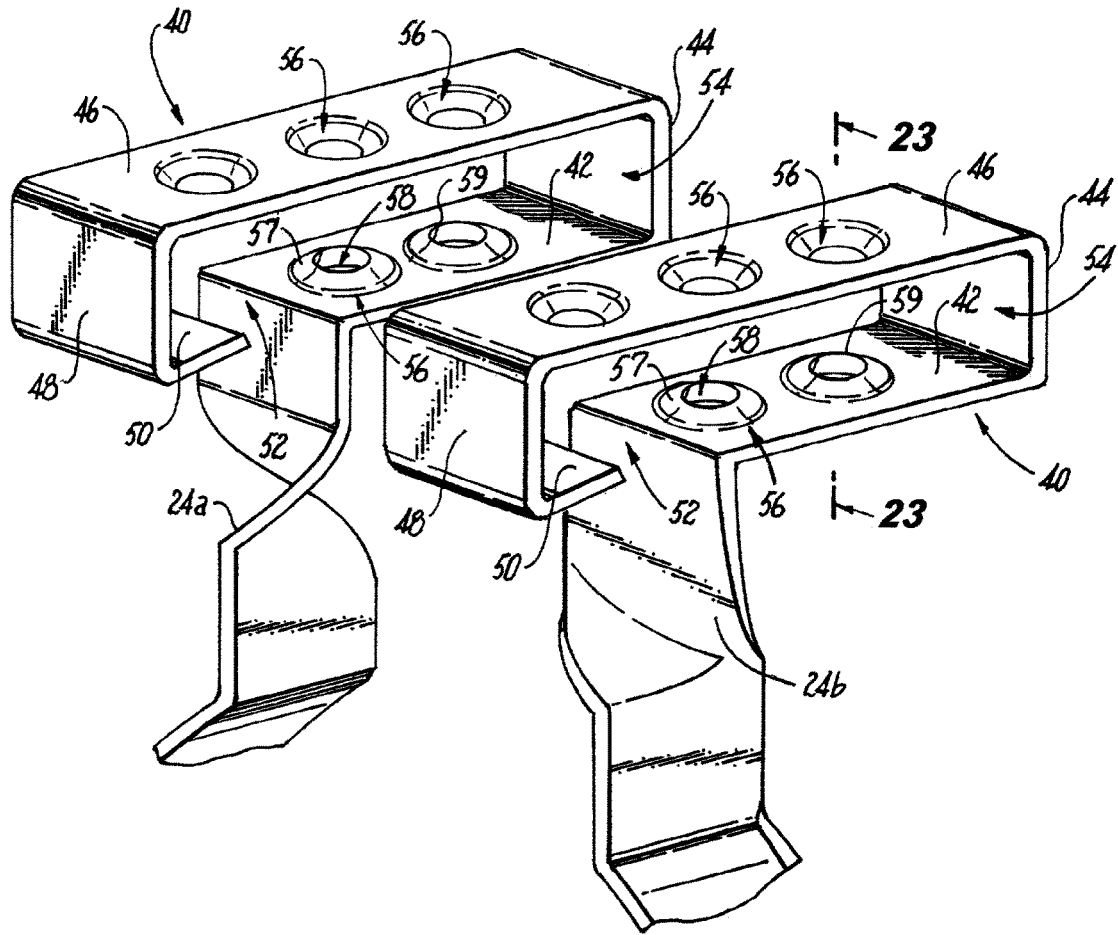
FIG. 22 is an enlarged perspective view of another exemplary embodiment of the attachment members according to the present disclosure, illustrating another exemplary embodiment of a plurality of protruding members extending from the walls of each attachment member into a pocket of each attachment member.
Figure 23:
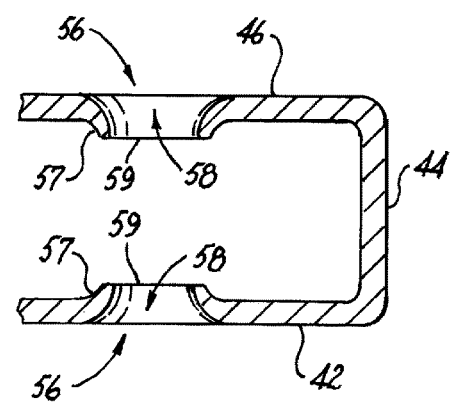
FIG. 23 is a cross-sectional view of one of the attachment members of FIG. 20 taken from line 23-23.

Referring to FIG. 19, another exemplary embodiment of a fastening system 90 that can be used with the bundle tie 60 or 70 of the present disclosure is shown. The fastening system 90 according to this exemplary embodiment will be described with reference to the bundle tie 70 described above, but one skilled in the art would readily appreciate that the fastening system according to this exemplary embodiment can be used with the bundle tie 60. In this exemplary embodiment, the fastening system 90 is configured to fixedly or releasably join the free end 72*b* of the strap 72 to the bulbus portion 22 of the bundle holding portion 20. As such, the fastening system 90 may be associated with both the free end 72*b* of the strap 72 and the bulbus portion 22 of the bundle holding portion 20, or the fastening system 90 may be associated with the free end 72*b* of the strap 72 or the bulbus portion 22 of the bundle holding portion 20. In the embodiment of FIG. 19, the fastening system 90 includes one or more keyholes 92, e.g., one or more slots, through the free end 72*b* of the strap 72 that engage with a hooked stud 94 extending from the bundle holding portion 20, as shown. The hooked stud 94 may be integrally or monolithically formed into the bulbus portion 22 of the bundle holding portion 20, or secured to the bulbus portion 22 via welds, adhesives or mechanical fasteners. Depending upon the size of the bundle 14, the hooked stud 94 is inserted into the appropriate keyhole 92 so that the free end 72*b* of the strap 72 is attached to the hooked stud 94 of the fastening system 90. The particular keyhole 92 in which the hooked stud 94 is inserted depends upon the desired snugness or tightness of the bundle 14 relative to the clip 200.

Turning now to FIGS. 20-23, the attachment members 40 of the present disclosure may also include one or more protruding members 56 that extend from the lower wall 42, the upper wall 46 and/or the side walls 44 and 48 into the pocket 54. The protruding members 56 may be provided to minimize any spaces that may form between the lower wall 42, the upper wall 46 and/or the side walls 44 and 48 and the structure wall 18 after a clip according to the present disclosure is affixed to the structure 12. A distal end of the protruding members 56 may be flat or rounded to engage an outer surface of the portion 18*b* of the structure wall 18 to create a tight fit between the walls of the attachment members 40 and the structure wall 18.

In the event the clips according to the present disclosure need to be electrically bonded to the structure 12, the protruding members 56 can also be shaped to pierce through any non-conductive material on an outer surface of the structure wall 18 to contact the underlying metal of the structure 12. For example, in the embodiment of FIGS. 20 and 21, the protruding members 56 may have distal ends that are pointed, as shown by the dotted lines, to pierce through non-conductive coatings on the structure wall 18. As another example, shown in FIGS. 22 and 23, each protruding member 56 may include a circular raised surface or wall 57 with a central opening 58 that form a sharp or piercing edge 59 at the distal end of the protruding member 56. As another example, each protruding member 56 may include a raised surface with a sharp pointed edge at the distal end of the protruding member.

While illustrative configurations of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable clip for supporting one or more items, the cable clip comprising:
 a cable holding portion made of an environmentally durable material, the cable holding portion having a bulbous portion that includes a first neck portion at a first end and a second neck portion at a second end;
 a first attachment member made of an environmentally durable material, wherein the first attachment member includes:
  a lower wall with a first end monolithically formed into or joined to a free end of the first neck portion of the cable holding portion and a second end monolithically formed into or joined to a first end of a first side wall;
  an upper wall with a first end monolithically formed into or joined to a second end of the first side wall and a second end monolithically formed into or joined to an upper first end of a second side wall;
  a lip having a first end monolithically formed into or joined to and cantilevered from a lower second end of the second side wall and a free second end extending in a direction of the first side wall such that there is a gap between the lower wall and the lip; and
  wherein the lower wall, the upper wall, the first and second side walls and the lip form a pocket;
 a second attachment member made of an environmentally durable material, wherein the second attachment member includes:
  a lower wall with a first end monolithically formed into or joined to a free end of the second neck portion of the cable holding portion and a second end monolithically formed into or joined to a first end of a first side wall;
  an upper wall with a first end monolithically formed into or joined to a second end of the first side wall and a second end monolithically formed into or joined to an upper first end of a second side wall;
  a lip having a first end monolithically formed into or joined to and cantilevered from a lower second end of the second side wall and a free second end extending in a direction of the first side wall such that there is a gap between the lower wall and the lip; and
  wherein the lower wall, the upper wall, the first and second side walls and the lip form a pocket.

2. The cable clip according to claim 1, wherein the cable holding portion comprises a flexible flat strip having a rectangular or square cross-section.

3. The cable clip according to claim 1, wherein the cable holding portion comprises a flexible solid or stranded rope-like material with a circular cross-section.

4. The cable clip according to claim 1, wherein the environmentally durable material comprises stainless steel or galvanized steel.

5. The cable clip according to claim 1, wherein the upper wall of the first attachment member is parallel to the lower wall of the first attachment member and perpendicular to the first and second side walls of the first attachment member, and wherein the upper wall of the second attachment member is parallel to the lower wall of the second attachment member and perpendicular to the first and second side walls of the second attachment member.

6. The cable clip according to claim 1, wherein the lip of the first attachment member is perpendicular to the second side wall of the first attachment member, and wherein the lip of the second attachment member is perpendicular to the second side wall of the second attachment member.

7. The cable clip according to claim 1, wherein the lip of the first attachment member is at an angle relative to the second side wall of the first attachment member, and wherein the lip of the second attachment member is at an angle relative to the second side wall of the second attachment member.

8. A cable clip for supporting one or more items, the cable clip comprising:
- a cable holding portion made of an environmentally durable material, the cable holding portion having a bulbous portion that includes a first neck portion at a first end and a second neck portion at a second end;
- a first attachment member monolithically formed into or joined to a free end of the first neck portion;
- a second attachment member monolithically formed into or joined to a free end of the second neck portion, wherein each of the first attachment member and the second attachment member include a rectangular or square structure comprising:
- a lower wall with a first end monolithically formed into or joined to the free end of the first neck portion or the second neck portion of the cable holding portion and a second end monolithically formed into or joined to a first end of a first side wall;
- an upper wall with a first end monolithically formed into or joined to a second end of the first side wall and a second end monolithically formed into or joined to an upper first end of a second side wall;
- a lip having a first end monolithically formed into or joined and cantilevered from a lower second end of the second side wall and a free second end extending in a direction of the first side wall such that there is a gap between the lower wall and the lip; and
- wherein the lower wall, the upper wall, the first and second side walls and the lip form a pocket.

9. The cable clip according to claim 8, wherein the cable holding portion is wider at the bulbous portion than at the first and second neck portions.

10. The cable clip according to claim 8, wherein the cable holding portion comprises a flexible flat strip having a rectangular or square cross-section.

11. The cable clip according to claim 8, wherein the cable holding portion comprises a flexible solid or stranded rope-like material with a circular cross-section.

12. The cable clip according to claim 8, wherein the environmentally durable material comprises stainless steel or galvanized steel.

13. The cable clip according to claim 8, wherein the upper wall of the first attachment member is parallel to the lower wall of the first attachment member and perpendicular to the first and second side walls of the first attachment member, and wherein the upper wall of the second attachment member is parallel to the lower wall of the second attachment member and perpendicular to the first and second side walls of the second attachment member.

14. The cable clip according to claim 8, wherein the lip of the first attachment member is perpendicular to the second side wall of the first attachment member, and wherein the lip of the second attachment member is perpendicular to the second side wall of the second attachment member.

15. The cable clip according to claim 8, wherein the lip of the first attachment member is at an angle relative to the second side wall of the first attachment member, and wherein the lip of the second attachment member is at an angle relative to the second side wall of the second attachment member.

16. The cable clip according to claim 8, wherein at least the upper wall of the first attachment member and the second attachment member, or the lower wall of the first attachment member and the second attachment member includes at least one protruding member extending into the pocket.

17. The cable clip according to claim 16, wherein the at least one protruding member comprises a flat or rounded distal end.

18. The cable clip according to claim 16, wherein the at least one protruding member comprises a pointed distal end.

19. The cable clip according to claim 16, wherein the at least one protruding member comprises a circular raised wall having a central opening that form a sharp edge or a piercing edge at the distal end of the protruding member.

20. A cable clip for supporting one or more items, the cable clip comprising:
- a cable holding portion made of an environmentally durable material, the cable holding portion having a bulbous portion that includes a first neck portion at a first distal end and a second neck portion at a second distal end;
- a first attachment member made of an environmentally durable material, wherein the first attachment member comprises:
  - a lower wall with a proximal end monolithically formed into or joined to the first distal end of the first neck portion and a distal end monolithically formed into or joined to a proximal end of a first side wall;
  - an upper wall with a proximal end monolithically formed into or joined to a distal end of the first side wall and a distal end monolithically formed into or joined to an upper proximal end of a second side wall;
  - a lip having a proximal end monolithically formed into or joined to and cantilevered from a lower distal end of the second side wall and a free distal end extending in a direction of the first side wall such that there is a gap between the lower wall and the lip;
  - wherein the lower wall, the upper wall, the first and second side walls and the lip form a pocket;
- a second attachment member made of an environmentally durable material, wherein the second attachment member comprises:
  - a lower wall with a proximal end monolithically formed into or joined to the second distal end of the second neck portion and a distal end monolithically formed into or joined to a proximal end of a first side wall;
  - an upper wall with a proximal end monolithically formed into or joined to a distal end of the first side wall and a distal end monolithically formed into or joined to an upper proximal end of a second side wall;

a lip having a proximal end monolithically formed into or joined to and cantilevered from a lower distal end of the second side wall and a free distal end extending in a direction of the first side wall such that there is a gap between the lower wall and the lip; and wherein the lower wall, the upper wall, the first and second side walls and the lip form a pocket.

* * * * *